US006982312B2

(12) United States Patent
Senga et al.

(10) Patent No.: US 6,982,312 B2
(45) Date of Patent: Jan. 3, 2006

(54) PROCESS FOR PRODUCING POLYARYLENE SULFIDE

(75) Inventors: Minoru Senga, Chiba (JP); Masaya Okamoto, Ibaraki (JP); Mikiya Hayashi, Chiba (JP)

(73) Assignees: Idemitsu Kosan Co., Ltd., Tokyo (JP); Petroleum Energy Center, A Jurdical Incorporated Foundation, Tokyo (JP)

( * ) Notice: Subject to any disclaimer, the term of this patent is extended or adjusted under 35 U.S.C. 154(b) by 0 days.

(21) Appl. No.: 10/471,663

(22) PCT Filed: Mar. 4, 2002

(86) PCT No.: PCT/JP02/01958

§ 371 (c)(1),
(2), (4) Date: Sep. 11, 2003

(87) PCT Pub. No.: WO02/072650

PCT Pub. Date: Sep. 19, 2002

(65) Prior Publication Data

US 2004/0092706 A1     May 13, 2004

(30) Foreign Application Priority Data

Mar. 12, 2001  (JP) ............................... 2001-68495

(51) Int. Cl.
*C08G 75/00*     (2006.01)
(52) U.S. Cl. ................... 528/373; 528/394; 528/482; 528/491; 528/502 R; 528/503
(58) Field of Classification Search ............... 528/373, 528/397, 482, 491, 502 R, 503
See application file for complete search history.

(56) References Cited

U.S. PATENT DOCUMENTS

| 4,066,632 | A  | 1/1978  | Anderson et al. |
| 4,415,729 | A  | 11/1983 | Scoggins et al. |
| 5,898,061 | A  | 4/1999  | Sase et al. |
| 6,316,536 | B1 | 11/2001 | Okamoto et al. |
| 6,562,900 | B2 | 5/2003  | Okamoto et al. |

FOREIGN PATENT DOCUMENTS

| EP | 0 259 984 A1 | 3/1988 |
| EP | 0 435 209 A2 | 7/1991 |
| JP | 58-147428    | 9/1983 |
| JP | 3-050237     | 3/1991 |
| JP | 9-169844     | 6/1997 |

OTHER PUBLICATIONS

Patent Abstracts of Japan, JP 2000-290375, Oct. 17, 2000.
Patent Abstracts of Japan, JP 07-010997, Jan. 13, 1995.

*Primary Examiner*—Duc Truong
(74) *Attorney, Agent, or Firm*—Oblon, Spivak, McClelland, Maier & Neustadt, P.C.

(57) ABSTRACT

There is disclosed a process for producing a polyarylene sulfide (PAS) which comprises reacting a sulfur source with a dihalogenated aromatic compound in the presence of an aprotic organic solvent, characterized in that the process comprises at least one polymerization reaction step wherein a polymer phase as a dispersed phase is in the form of spherical droplets. It is made possible by the continuous polymerization process to discharge the polymer phase and solvent phase from a polymerization vessel at a constant ratio and as a result, to maintain PAS composition (concentration) at a constant level at all times, and thus to provide a continuous PAS production process which is effective for enhancing its molecular weight and stabilizing the same.

10 Claims, No Drawings

PROCESS FOR PRODUCING POLYARYLENE SULFIDE

TECHNICAL FIELD

The present invention relates to a process for producing a polyarylene sulfide. More particularly, it pertains to a process for producing a polyarylene sulfide which is high-quality, inexpensive, minimized in variation in molecular weight, and thus stabilized in the case of producing a polyarylene sulfide which is useful in the fields of electronic materials, electrical materials, automobiles and heat resistant materials.

BACKGROUND ART

A polyarylene sulfide (hereinafter sometimes referred to as "PAS"), especially polyphenylene sulfide is known as an engineering plastic which is excellent in mechanical strength, heat resistance, flame retardancy, solvent resistance and the like and which has good electrical characteristics and high rigidity. Thus it is widely employed as a variety of materials such as automobiles parts, electronic parts, electrical parts and mechanical parts.

Such PAS resin as stated above has hitherto been produced by a batch process, but there has recently been an increasing demand for continuous polymerization process for the sake of improvement in the production efficiency. There are disclosed as a continuous polymerization process, for instance, U.S. Pat. Nos. 4,056,515, 4,060,520, 4,066,632 and the like. However, any of the above-disclosed process involves the problem in that the molecular weight of the PAS thus obtained is markedly low.

On the other hand, there is proposed for the purpose of increasing its molecular weight, a continuous polymerization process wherein a phase separation agent (water, sodium acetate, an alkali metal salt or the like) is used to separate into a polymer phase and a solvent phase (refer to Japanese Patent Application Laid-Open No. 169844/1997 (Heisei 9).

In the case of continuous polymerization process wherein such a phase separation agent is used, there is such a problem that polymerization reaction liquid becomes a phase separation state in which a polymer phase and a solvent phase are separated from each other, the polymer phase settles owing to difference in specific gravity in a place difficult to be influenced by shearing force due to stirring and the like such as the bottom of a polymerization vessel and inside of piping, thereby for instance, making it impossible to keep the compositional ratio (concentration) of polymer phase/solvent phase at a constant level during the transfer of the polymerization reaction liquid, and as a result variation in the polymer concentration in the polymerization vessel leads to variation in the the molecular weight, thus making it difficult to produce PAS which is stabilized in its molecular weight.

With regard to the above-mentioned problem, the process in the foregoing Japanese Patent Application Laid-Open No. 169844/1997 (Heisei 9) in which a proposal is made of a method for separately withdrawing the polymer phase and solvent phase fails to sufficiently cope with the above-mentioned problem because of the use of a special shape of a reactor, a complicated piping structure, difficulty in flow rate control and the like factors. In such circumstances, it has been eagerly desired to develop a continuous polymerization process which uses a phase separation agent and which is capable of discharging the polymer phase and solvent phase from a polymerization vessel at a constant ratio and as a result, maintaining the PAS composition (concentration) in the polymerization vessel at a constant level at all times.

DISCLOSURE OF THE INVENTION

The present invention has been made in the light of the subject as mentioned above. An object thereof is to establish a continuous polymerization process for producing PAS which is capable of discharging the polymer phase and solvent phase from a polymerization vessel at a constant ratio and as a result, always maintaining PAS composition (concentration) in the polymerization vessel at a constant level and which is effective for enhancing and stabilizing ite molecular weight.

In view of the above-mentioned subject, intensive extensive research and investigation were accumulated by the present inventors. As a result, it has been found that the object of the present invention can be achieved by sphering polymer phase droplets in the substantial polymerization step during the continuous production of PAS. Thus the present invention has been accomplished on the basis of the foregoing findings and information.

Specifically, the present invention provides a process for continuously producing a polyarylene sulfide which comprises reacting a sulfur source with a dihalogenated aromatic compound in the presence of an aprotic organic solvent, characterized in that said process comprises at least one polymerization reaction step wherein a polymer phase as a dispersed phase is in the form of spherical droplets.

THE MOST PREFERRED EMBODIMENT TO CARRY OUT THE INVENTION

In the following, more detailed description will be given of the present invention.

In the present invention, the process for continuously producing a polyarylene sulfide comprises reacting a sulfur source with a dihalogenated aromatic compound in the presence of an aprotic organic solvent, and is characterized in that said process comprises at least one polymerization reaction step wherein the reaction system is separated into two phases including a polymer phase and a solvent phase, and the polymer phase is the dispersed phase in the form of spherical droplets. Specifically, the present invention relates to a continuous polymerization process wherein whole polymerization operation is put into practice either by single stage or by multistage wherein the polymerization reaction liquid is transferred in turn through polymerization vessels connected in multistage, including the feed of starting materials for polymerization, a solvent and the like, and withdrawing of a production system.

The present invention is characterized in that the process comprises at least one polymerization reaction step wherein the polymer phase is the dispersed phase in the form of spherical droplets. A method for forming such spherical droplets is not specifically limited, but is exemplified, for instance, by a method wherein a phase separation agent and an aprotic organic solvent are fed in a reactor prior to the start of continuous polymerization, a method wherein spherical droplets are formed in a reactor in advance through batch polymerization under prescribed conditions, and the like method.

The continuous polymerization step is carried out usually at 230 to 280° C., preferably 240 to 270° C. The temperature, when being lower than 230° C., sometimes results in failure to form spherical droplets, whereas the temperature, when being higher than 280° C., sometimes brings about decomposition of the polymer.

By the term "spherical" as mentioned herein is meant to include not only exact sphere but also ellipsoid, a form similar thereto and a form substantially close to sphere in which the sphere, ellipsoid or the like is deformed in part.

Examples of the phase separation agent include lithium chloride, sodium acetate and a salt of an alkali metal such as lithium, water and the like, of which lithium chloride is preferably used in particular.

Examples of the aprotic organic solvent include in general, aprotic organic polar solvents such as amide compounds, lactam compounds, urea compounds, organosulfur compounds and cyclic organophosphorus compounds, which can be used as single solvent or a mixed solvent.

The above-mentioned amide compounds among aprotic organic polar solvents are exemplified by N,N-dimethylformamide; N,N-diethylformamide; N,N-dimethylacetoamide; N,N-diethylacetoamide; N,N-dipropylacetoamide; N,N-dimethylbenzoic acid amide, etc.

The aforesaid lactam compounds are exemplified by N-alkyl-caprolactam such as caprolactam; N-methylcaprolactam; N-ethylcaprolactam; N-isopropylcaprolactam; N-isobutylcaprolactam; N-n-propylcaprolactam; N-n-butylcaprolactam; and N-cyclohexylcaprolactam; N-methyl-2-pyrrolidone(NMP); N-ethyl-2-pyrrolidone; N-isopropyl-2-pyrrolidone; N-isobutyl-2-pyrrolidone; N-n-propyl-2-pyrrolidone; N-n-butyl-2-pyrrolidone; N-cyclohexyl-2-pyrrolidone; N-methyl-3-methyl-2-pyrrolidone; N-ethyl-3-methyl-2-pyrrolidone; N-methyl-3,4,5-trimethyl-2-pyrrolidone; N-methyl-2-piperidone; N-ethyl-2-piperilidone; N-isopropyl-2-piperidone; N-methyl-6-methyl-2-piperidone; N-methyl-3-ethyl-2-piperidone, etc.

The aforesaid urea compounds are exemplified by tetramethylurea; N,N'-dimethylethyleneurea; N,N'-dimethylpropyleneurea, etc.

The aforesaid organosulfur compounds are exemplified by dimethylsulfoxide; diethylsulfoxide; diphenylsulfone; 1-methyl-1-oxosulfolane; 1-ethyl-1-oxosulfolane; 1-phenyl-1-oxosulfolane etc.

The aforesaid cyclic organophosphorus compounds are exemplified by 1-methyl-1-oxophosfolane; 1-n-propyl-1-oxophosfolane; 1-phenyl-1-oxophosfolane, etc.

Any of the above-exemplified aprotic organic polar solvent can be used alone or by mixing with at least one other or by mixing with a solvent which is not cited above and does not impair the object of the present invention so as to enable the mixture to be used as the foregoing aprotic organic solvent.

Of the various aprotic organic solvents as exemplified above are preferable N-alkylcaprolactam and N-alkylpyrrolidone, among which N-methyl-2-pyrrolidone (NMP) is particularly preferable.

The content of the above-mentioned phase separation agent in the aprotic organic solvent in the present invention is not specifically limited provided that it meets the condition that the polymer phase is separated, and it is usually 0.05 to 3.0 mole, preferably 0.2 to 2.5 mole based on one mole of sulfur atom in the sulfur source. The content of the phase separation agent, when being less than the above lower limit, sometimes brings about difficulty in forming spherical polymer phase.

There is no specific limitation on the continuous polymerization process according to the present invention including the order of adding the starting material components, except the conditions as described hereinbefore. In the case however, where the aprotic organic polar solvent containing a phase separation agent is incorporated with a sulfur source such as lithium sulfide and polymerizing material such as dihalogenated aromatic compound or PAS with low molecular weight, it is necessary that reaction liquid becomes a phase separation state in which a polymer phase and a solvent phase are separated from each other, that is to say, both the polymer phase and the solvent phase be in the form of liquid phase, and separated from each other.

In the present invention use is made of as a sulfur source, an alkali metal sulfide, an alkali metal hydrosulfide, hydrogen sulfide and the like, of which lithium sulfide is particularly preferably used. Any of the sulfur sources can be used when necessary, in combination with an alkali metal hydroxide.

The above-mentioned dihalogenated aromatic compound is not specifically limited. It is preferably exemplified by a well known compound which is employed for producing a polyarylene sulfide, and is specifically exemplified by dihalogenated benzene such as m-dihalogenated benzene and p-dihalogenated benzene, alkyl-substituted dihalogenated benzene, cycloalkyl-substituted dihalogenated benzene and the like such as 2,3-dihalogenated toluene; 2,5-dihalogenated toluene; 2,6-dihalogenated toluene; 3,4-dihalogenated toluene; 2,5-dihalogenated xylene; 1-ethyl-2,5-dihalogenated benzene; 1,2,4,5-tetramethyl-3,6-dihalogenated benzene; 1-n-hexyl-2,5-dihalogenated benzene; and 1-cyclohexyl-2,5-dihalogenated benzene, aryl-substituted dihalogenated benzene such as 1-phenyl-2,5-dihalogenated benzene; 1-benzyl-2,5-dihalogenated benzene; and 1-p-toluyl-2,5-dihalogenated benzene, dihalobiphenyl such as 4,4'-dihalobiphenyl, dihalonaphthalene such as 1,4-dihalonaphthalene; 1,6-dihalonaphthalene; and 2,6-dihalonaphthalene, and the like.

Two halogen atoms in these dihalogenated aromatic compound are each fluorine, chlorine, bromine or iodine, and may be the same as or different from one another. Of these, are preferable dihalogenated benzenes, and are particularly preferable those containing at least 50 mole % of p-dichlorobenzene. The blending amount of the dihalogenated aromatic compound based on hydrogen sulfide is set on 0.5 to 2.0, preferably 0.9 to 1.3 expressed in terms of the molar ratio of dihalogenated aromatic compound/sulfur atom. The molar ratio, when being less than 0.5, sometimes causes decomposition of PAS, whereas the molar ratio, when being more than 2.0, results in a high recovery cost of the dihalogenated aromatic compound.

The number of moles of the dihalogenated aromatic compound contained in one liter of the aprotic organic solvent is set on 0.8 to 4.0 moles, preferably 1.2 to 3.7 moles. The number of moles, when being less than 0.8, sometimes gives rise to a sharp decrease in the molecular weight of PAS along with difficulty in controlling the same, whereas the number, when being more than 4.0, sometimes brings about a decrease in the molecular weight of PAS, thus making it impossible for the resin to achieve physical properties of a practical level. The blending ratio of each of the components is expressed by the ratio of flow rate (weight, number of moles or the like) of each of the components that are allowed to flow into a prescribed vessel (the same holds in the following description).

It is possible in the present invention to add, to the reaction system when necessary, a branching agent such as a halogenated aromatic compound containing active hydrogen, a polyhalogenated aromatic compound having at least three halogen atoms in its one molecule and a polyhalogenated aromatic nitrile compound that are properly selected for use, in addition to the foregoing dihalogenated aromatic compound.

As mentioned hereinbefore, the continuous polymerization step is carried out usually at 230 to 280° C., preferably 240 to 270° C. The other reaction conditions are not specifically limited, but may be in accordance with the conditions as disclosed in publicly known literatures such as Japanese Patent Application Laid-Open No. 248077/1994 (Heisei 6).

For instance, the retention time of a polymerizing material or PAS with a low molecular weight that are allowed to flow in a continuous polymerization vessel, although varies depending upon the flow rate of each of the components as well as the shape and size of the vessel, is set on 0.1 to 20 hours, preferably 0.1 to 10 hours, particularly preferably 0.1 to 5 hours.

In the present invention, the number of stages that are usable in the polymerization vessel, which is not specifically limited, may be multistage wherein the temperature condition may be altered per stage. It is preferable in the case of multistage that in at least one polymerization vessel including the final stage vessel, the polymer phase be in the form of spherical droplets. Particularly preferably, the polymer phase in every vessel is in the form of spherical droplets. In the present invention, the phase separation agent needs only to be added to at least one polymerization vessel including the final stage vessel, and it is preferably added to every vessel with a view to maintain the chemical composition in all the polymerization vessels at a constant level.

The polymerization vessel and an agitational impeller that are used in the present invention are not specifically limited, but the polymerization vessel is preferably of the type well suited for complete mixing, and the agitational impeller is preferably a large size impeller such as a full zone impeller.

As the starting material to be of service in the present invention, the foregoing sulfur source such as lithium sulfide and the dihalogenated aromatic compound may be used as such, but is preferably subjected to preliminary polymerization in a continuous or batchwise process with a view to obtain PAS with a high molecular weight.

The preliminary polymerization, which is not specifically limited, is put into practice by adding a dihalogenated aromatic compound, water and an aprotic organic solvent to the reaction product containing lithium sulfide, and preserving the mixture at 180 to 220° C. for 0.1 to 10 hours, preferably 1 to 6 hours in a continuous step. Preferably, the blending amount of each of the components satisfies the following requirements.

The number of moles of the dihalogenated aromatic compound contained in one liter of the aprotic organic solvent is preferably 0.8 to 4.0 (moles/liter), more preferably 1.2 to 3.7 (moles/liter). The blending amount of the dihalogenated aromatic compound based on 1 mole of lithium sulfide is preferably 0.5 to 2.0 moles, more preferably 0.9 to 1.3 moles. The ratio by weight of water to the aprotic organic solvent (water/aprotic organic solvent) is preferably at least 3/97, more preferably in the range of 5/95 to 15/85.

Subsequently, the substantial polymerization procedure as mentioned hereinbefore is carried out by using the the starting material for polymerization or the resultant PAS with a low molecular weight.

The polymerization solution obtained after the substantial polymerization can be subjected to cleaning operation by adding water thereto to the extent that the PAS is not solidified. The amount of water, which varies depending upon the amount and the temperature of the polymerization solution, may be such an amount that the PAS is not solidified nor precipitated by overcooling. It is preferable to usually agitate the content in a cleaning tank so that the polymerization solution and water are sufficiently mixed with each other.

A cleaning solution is not specifically limited provided that impurities or by-products which are stuck to the polymer do not exert adverse influence on the polymer by being dissolved in the cleaning solution. Examples of the cleaning solution include methanol, acetone, benzene, toluene, water and NMP, of which water is preferable.

The polymerization solution after the completion of the polymerization reaction is sent to a separation tank, where the solution is subjected to a separation procedure to separate it into a polymer phase and a solvent phase.

A process for converting the solvent phase thus separated (consisting essentially of NMP, water and LiCl) into lithium sulfide via lithium hydroxide is disclosed, e.g. in Japanese Patent Application Laid-Open No. 319009/2000 (Heisei 12), etc.

For the purpose of assuring more sufficient effect on cleaning and separation, the steps of cleaning and separation are preferably repeated optional plural times.

In the present invention, since the polymer phase in which the steps of cleaning and separation have been completed still contains a solvent, it is preferable to remove the solvent. The solvent removal method is not specifically limited, but may be in accordance with a well known solvent removal method which is used in the production of PAS, for instance, a flashing method disclosed in Japanese Patent Application Laid-Open No. 33878/1995 (Heisei 7).

The PAS in which the solvent removal procedure has been completed can be taken out in a molten state or in the form of granule after being solidified by cooling using a proper cooling method. The cooling method is exemplified by air cooling, water cooling, oil cooling and the like.

It is enabled by the simplified process according to the present invention to readily and steadily produce a polyarylene sulfide which has a sufficiently high molecular weight, an intrinsic viscosity [η] of at least 0.10, preferably at least 0.13, a melt index [MI] of 0 to 1000 g/10 minutes, and as the case may be, has gel forming property. In addition, variation in the intrinsic viscosity with the lapse of time or among the batches upon the production of the polymer is markedly improved, wherein the intrinsic viscosity is measured with a Ubbellohde viscometer for 0.4 deciliter/g solution of the polyarylene sulfide obtained by the foregoing process in α-chloronaphthalene at 206° C.

In the case where the polyarylene sulfide (PAS) obtained by the process according to the present invention is molded into any of a variety of products, the PAS can be properly and optionally incorporated at need with an other polymer, pigments, graphite, metallic powders, glass powders, quartz powders, talc, calcium carbonate, glass fibers, carbon fibers, fillers such as various whiskers, stabilizing agents, release agent, etc.

By the process according to the present invention which comprises at least one polymerization reaction step wherein a polymer phase as a dispersed phase is in the form of spherical droplets, it is made possible to establish a method capable of discharging the polymer phase and solvent phase from a polymerization vessel at a constant ratio and as a result, maintaining PAS composition (concentration) at a constant level at all times, and thus to provide a continuous PAS production process which is effective for enhancing its molecular weight and stabilizing the same.

In what follows, the present invention will be described in more detail with reference to working examples, which however shall never limit the present invention thereto.

EXAMPLE 1

Preparatory Polymerization

A one m³ titanium-made starting material synthesis vessel equipped with a stirrer was charged with 554 kg of N-methyl-2-pyrrolidone(NMP) and 100 kg (2.38 kilomole) of lithium hydroxide (LiOH.H₂O), and the resultant mixture was heated to and kept at 140° C. The water contained in the lithium hydroxide as a starting material was removed by batch distillation. Thereafter, 65 n-kiloliter of gaseous hydrogen sulfide was blown into the mixture at a temperature kept at 130° C. to synthesize lithium hydroxide.

Subsequently, blowing of hydrogen sulfide was stopped, and the synthesis vessel was again heated to raise the temperature up to 205° C. Accompanying the temperature rising, the water by-produced on blowing hydrogen sulfide was removed by batch distillation, while lithium sulfide was produced from lithium hydrosulfide.

After the completion of the reaction, the reaction product contained 1.08 kilomole of lithium sulfide and 0.214 kilomole of lithium metylbutylate. To the reaction product was added 165.1 kg (1.123 kilomole) of p-dichlorobenzene (PDCB) and further 583 kg (0.32 kilomole) of pure water to proceed with reaction at 210° C. for 3 hours. Then the reaction liquid was cooled to 60° C. or lower, and the resultant reaction mixture was taken out from the reactor into a 20 liter vessel. The conversion of the PDCB was 85%.

Substantial Polymerization

A 10 liter autoclave equipped with a full zone impeller was charged with 855 g of lithium chloride as a phase separation agent and 5145 g of NMP, and was heated to raise the temperature up to 260° C. The above-prepared prepolymer was preserved at 60° C. and was continuously supplied to the reactor at a flow rate of 33.3 g/minute by the use of a gear pump.

On the other hand, about 150 to 200 g of the polymerization liquid was withdrawn from the reactor through a withdrawing nozzle every 5 minutes approx. so as to maintain the liquid at a constant level. The procedure was continued for 24 hours, while the dispersion state was visually confirmed by the use of a microscope, and molecular weight of the polymer was determined by measuring the intrinsic viscosity [η]. The results are given in Table 1. The intrinsic viscosity thereof was measured with a Ubbellohde viscometer for 0.4 deciliter/g solution of the polyarylene sulfide (PAS) in α-chloronaphthalene at 206° C., the PAS had been cleaned with a large quantity of water and dried.

EXAMPLE 2

A 10 liter autoclave equipped with a full zone impeller was charged with 10 mole (459.4 g) of lithium sulfide, 10 mol (1470.1 g) of p-dichlorobenzene, one mole (41.96 g) of lithium hydroxide monohydrate, 4 mole (72.1 g) of water and 4.3 liter of NMP. The resultant mixture was heated to 260° C. for 30 minutes under stirring at 125 r.p.m. and subsequently was allowed to react for 2 hours.

Thereafter, the prepolymer which had been obtained in the same manner as in Example 1 was added to the above-obtained reaction liquid. Thus continuous substantial polymerization was carried out and the objective product was evaluated in the same manner as in Example 1. The results are given in Table 1.

COMPARATIVE EXAMPLE 1

The procedure in Example 1 was repeated to synthesize PAS and evaluate the same except that lithium chloride feeding was omitted. The results are given in Table 1.

TABLE 1

| Time (hour) | | 3 | 6 | 9 | 12 | 15 | 18 | 21 | 24 |
|---|---|---|---|---|---|---|---|---|---|
| Ex. 1 | [η] | 0.27 | 0.28 | 0.28 | 0.28 | 0.28 | 0.28 | 0.28 | 0.28 |
|  | Disper | A | A | A | A | A | A | A | A |
| Ex. 2 | [η] | 0.28 | 0.28 | 0.28 | 0.28 | 0.28 | 0.28 | 0.28 | 0.28 |
|  | Disper | A | A | A | A | A | A | A | A |
| C/Ex. 1 | [η] | 0.25 | 0.28 | 0.22 | 0.25 | 0.28 | 0.20 | 0.22 | 0.25 |
|  | Disper | B | B | B | B | B | B | B | B |

{Remarks}
Ex: Example,
C/Ex: Comparative Example,
Disper: dispersibility,
A: spherically dispersed phase,
B: unstably dispersed phase

INDUSTRIAL APPLICABILITY

The polyarylene sulfide obtained by the production process according to the present invention can be preferably utilized as a material for a variety of molded articles, for instance, a material for films, fibers, mechanical parts, electrical parts, electronic parts and the like.

What is claimed is:

1. A process for continuously producing a polyarylene sulfide which comprises
   (a) batch polymerizing a sulfur source with a dihalogenated aromatic compound in the presence of an aprotic organic solvent to produce a polymerization product,
   (b) feeding a phase separation agent and an aprotic organic solvent into a reactor, and
   (c) feeding the polymerization product of (a) to the reactor in (b) after the phase separation agent and aprotic solvent, such that a spherical polymer phase is formed as a dispersed phase, wherein polyarylene sulfide is continuously produced in the reactor from the reaction of the dihalogenated aromatic compound and the sulfur source in the presence of the aprotic organic solvent.

2. The process according to claim 1, wherein the polyarylene sulfide in step (c) is carried out at a temperature in the range of 240 to 280° C.

3. The process according to claim 1, wherein the phase separation agent is lithium chloride.

4. The production process according to claim 1, wherein the aprotic organic solvent is a N-alkylcaprolactam or a N-alkyl-pyrrolidone or a mixture thereof.

5. The production process according to claim 1, wherein the batch polymerizing is carried out at a temperature in the range of 180 to 220° C.

6. A process for producing an article comprising polyarylene sulfide, comprising producing polyarylene sulfide according to the process of claim 1; and forming the article from the polyarylene sulfide produced.

7. A process for producing an article comprising polyarylene sulfide, comprising producing polyarylene sulfide according to the process of claim 2; and forming the article from the polyarylene sulfide produced.

8. A process for producing an article comprising polyarylene sulfide, comprising producing polyarylene sulfide according to the process of claim 3; and forming the article from the polyarylene sulfide produced.

9. A process for producing an article comprising polyarylene sulfide, comprising producing polyarylene sulfide according to the process of claim 4; and forming the article from the polyarylene sulfide produced.

10. A process for producing an article comprising polyarylene sulfide, comprising producing polyarylene sulfide according to the process of claim 5; and forming the article from the polyarylene sulfide produced.

* * * * *